(12) United States Patent
Farley et al.

(10) Patent No.: US 8,499,927 B2
(45) Date of Patent: Aug. 6, 2013

(54) MATERIAL MOVING SYSTEM

(75) Inventors: Herbert M. Farley, Elizabethtown, PA (US); Andrew V. Lauwers, Stevens, PA (US); Robert Stewart Boyd, Mount Joy, PA (US)

(73) Assignee: CNH America, LLC, New Holland, PA (US)

( * ) Notice: Subject to any disclaimer, the term of this patent is extended or adjusted under 35 U.S.C. 154(b) by 36 days.

(21) Appl. No.: 13/329,415

(22) Filed: Dec. 19, 2011

(65) Prior Publication Data
US 2013/0153373 A1 Jun. 20, 2013

(51) Int. Cl.
*F16G 13/06* (2006.01)
(52) U.S. Cl.
USPC ............................ 198/851; 474/228; 474/218
(58) Field of Classification Search
USPC ................. 198/851–853; 474/227–231, 218
See application file for complete search history.

(56) References Cited

U.S. PATENT DOCUMENTS

| | | |
|---|---|---|
| 611,950 A | 10/1898 | Soule |
| 658,017 A | 9/1900 | Levalley |
| 901,789 A | 10/1908 | Dodge |
| 2,061,223 A | 11/1936 | Cunningham et al. |
| 2,541,911 A | 2/1951 | Bingham |
| 3,379,072 A | 4/1968 | Kuntzmann |
| 4,272,952 A * | 6/1981 | Graham ............................ 59/84 |
| 4,682,687 A * | 7/1987 | Leege et al. ................... 198/852 |
| 4,886,485 A * | 12/1989 | Bartoletto ...................... 474/219 |
| 5,092,118 A * | 3/1992 | VanDeMark ...................... 59/84 |
| 5,305,872 A | 4/1994 | Hutton |
| 6,364,799 B1 * | 4/2002 | Campagnolo ................. 474/206 |
| 6,564,539 B2 | 5/2003 | Bedford et al. |
| 7,600,633 B2 | 10/2009 | Rathbun et al. |
| 7,726,469 B2 * | 6/2010 | Frost et al. ..................... 198/851 |

* cited by examiner

*Primary Examiner* — Mark A Deuble
(74) *Attorney, Agent, or Firm* — Patrick M. Sheldrake

(57) ABSTRACT

A pin assembly for a chain of a material moving system includes a pin having a first end and a second end, the first end having a threaded portion extending to a guide region having a reduced cross-section compared to the threaded portion, the threaded portion being at least partially modified during fabrication of the pin, the guide region extending to a transition region of increasing cross-section with respect to the guide region from the first end toward the second end, the transition region terminating at a shoulder. A fastener is configured to engage the threaded portion during construction of the chain. During construction of the chain, the pin and the fastener form a compression fit therebetween in response to a predetermined torque applied to the fastener, damaging at least a segment of the fastener, substantially limiting reuse of the fastener after the fastener has been disassembled from the pin.

12 Claims, 3 Drawing Sheets

MATERIAL MOVING SYSTEM

This invention relates generally to a material moving system and, more specifically, to a material moving system including a chain.

BACKGROUND OF THE INVENTION

Material moving systems, such as those utilized with chain assemblies are used in industry. Due to assembly and service requirements, most, if not all, drive/conveyor chain assemblies employ some form of a connecting link that permits the chain assembly to be removed/installed without needing to break the rivet joints that hold the links of the chain assembly together.

In order to allow the connector link to be removed easily, the connector link generally incorporates a "loose fit" between the sidebar or chain link and the pins of the connector link. The tensile loads the chain assemblies experience during normal usage, such as those employed on combine harvesters, causes the pins and sidebars in the chain assembly to flex. The additional clearance resulting from the loose fit of the connector link components allows the pin and sidebars of the connector link to flex a greater amount than the other components of the chain assembly, resulting in greater amounts of wear and significantly less service life than the other components in the chain assembly. To reduce clearances, connector links may use a variety of containment devices, such as pins, wires, snap rings, etc.

Due to the cyclic loading and interaction with crop flow that the containment devices are subjected to, proper assembly of containment devices is important. One type of containment device is a single-use containment device. That is, the containment device is subjected to a single installation, then discarding the original containment device in exchange for another containment device when a subsequent removal/installation is required. However, the "single use" practice may not be followed when the containment device is capable of being reused. In addition, even where containment devices that could be properly installed multiple times are used, proper assembly may not be reliably determined.

Accordingly, what is sought is a material moving system that results in damage to the containment device during installation/removal, substantially limiting reuse of the containment device and provides for reliably determining when a proper installation of the containment device has occurred.

SUMMARY OF THE INVENTION

In accordance with one aspect of the present invention, a pin assembly for a chain of a material moving system includes a pin having a first end and a second end. The first end includes a threaded portion extending to a guide region having a reduced cross-section compared to the threaded portion, the threaded portion being at least partially modified during fabrication of the pin. The guide region extends to a transition region of increasing cross-section with respect to the guide region from the first end toward the second end, the transition region terminating at a shoulder. A fastener is configured to engage the threaded portion during construction of the chain. In response to an opening of a first chain link being directed over the first end of the pin during construction of the chain, the opening having a cross-section greater than a cross-section of the guide region and less than or equal to a cross-section of the transition region. The fastener urges the first chain link to a position over the transition region, forming a compression fit between the opening and the transition region in response to a predetermined torque applied to the fastener. During application of the predetermined torque to the fastener, the fastener threadedly engages the threaded portion of the pin. At least a threaded segment of the fastener is damaged, substantially limiting reuse of the fastener after the fastener has been disassembled from the threaded portion of the pin.

In accordance with another aspect of the present invention, a method for substantially preventing inadvertent subsequent assembly of a preassembled chain of a material moving system due to the prevention of reuse of previously engaged portions of the chain includes providing a pin having a first end and a second end, the first end including a threaded portion extending to a guide region having a reduced cross-section compared to the threaded portion. The threaded portion is at least partially modified during fabrication of the pin, the guide region extending to a transition region of increasing cross-section with respect to the guide region from the first end toward the second end, the transition region terminating at a shoulder. The method further includes providing a fastener configured to engage the threaded portion of the pin during construction of the chain. The method further includes assembling the pin with the fastener, forming a compression fit between the opening and the transition region in response to a predetermined torque applied to the fastener and resulting in damage to at least a segment of the fastener, substantially limiting reuse of the fastener after the fastener has been disassembled from the pin.

An advantage of the material moving system disclosed herein is that it substantially limits reuse of containment devices and provides for reliably determining when a proper installation of the containment device has occurred.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
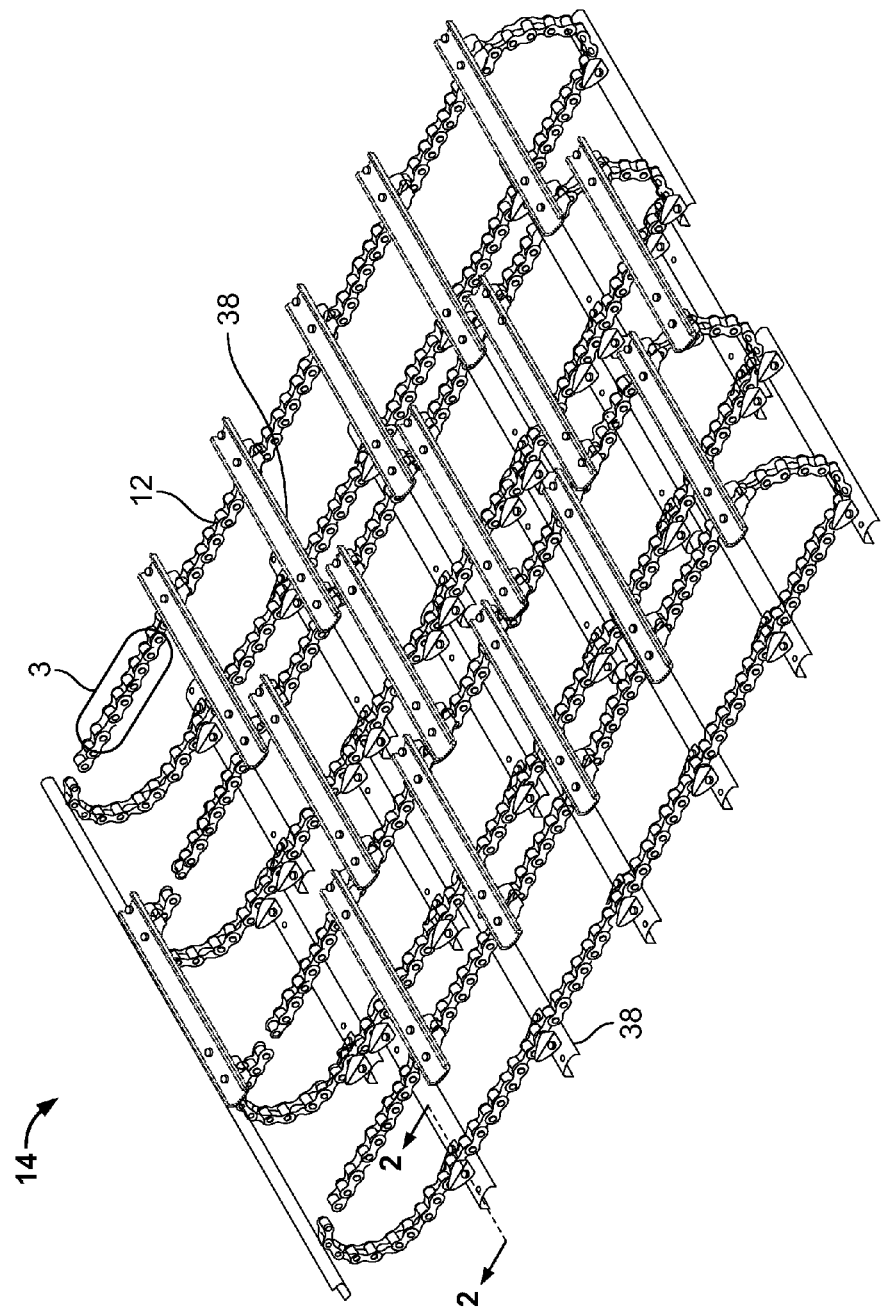
FIG. 1 is a top perspective view of a conveyor chain assembly of the present invention.
Figure 2:
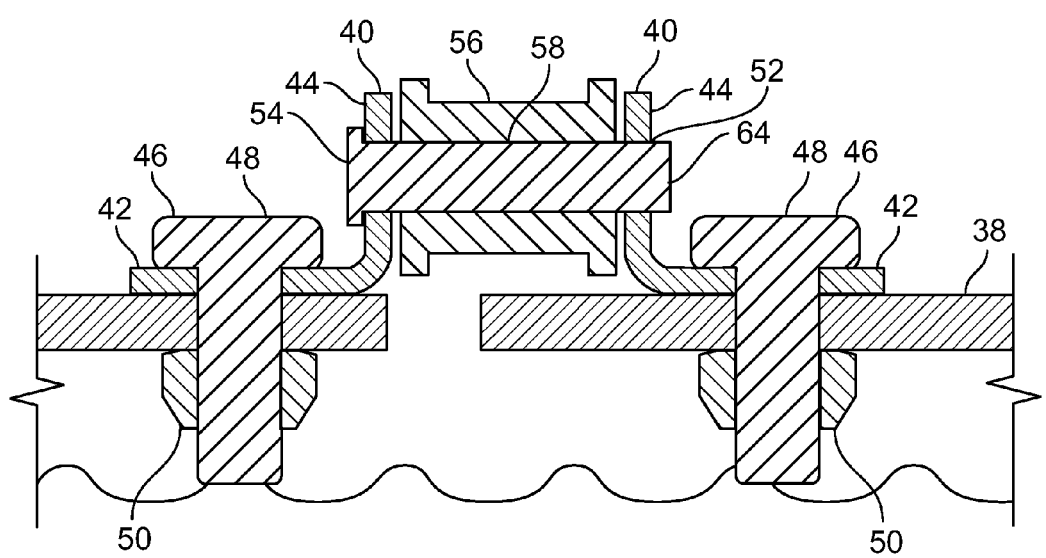
FIG. 2 is a cross-section taken along line 2-2 of FIG. 1 of the present invention.

As shown in FIG. 1, a material moving system 14, also referred to as a conveyor chain assembly, may be used with harvesting devices, such as a combine. Material moving system 14 may include a number of chains 12, also referred to as chain strands, in which slats 38 typically extend transversely to the direction of the chain strands to help convey the crop being harvested for further processing by the harvesting device. As further shown FIG. 2, slat 38 may be secured to and supported by adjacent chains each with the chain including a pair of brackets 40, with each bracket having a first leg 42 and a second leg 44. A fastener 46, such as a bolt 48 and a nut 50 secure leg 42 to slat 38. The pair of second legs 44 of brackets 40 are spaced apart and include respective openings 52 formed in each of the legs that are in alignment with each other to receive a fastener 54, such as a rivet. A spacer 56 is positioned between the pair of second legs 44, which spacer further includes an opening 58. A fastener 54, such as a rivet, is configured to collectively extend through each of openings 52 of the pair of second legs 44, as well as through opening 58 formed in spacer 56. Rivet or fastener 54 is then installed, also referred to as "bucking", such as by application of sufficient opposed forces (typically reciprocating forces) along the longitudinal axis of the fastener, until the cross-sectional area of end 64 of fastener 54 is greater than the cross-sectional area of respective openings 52 of second legs 44 of brackets 40, thereby permitting the fastener to secure spacer 56 in position between opposed second legs 44 of respective brackets 40. It is to be understood that other arrangements may be used.

Figure 3:
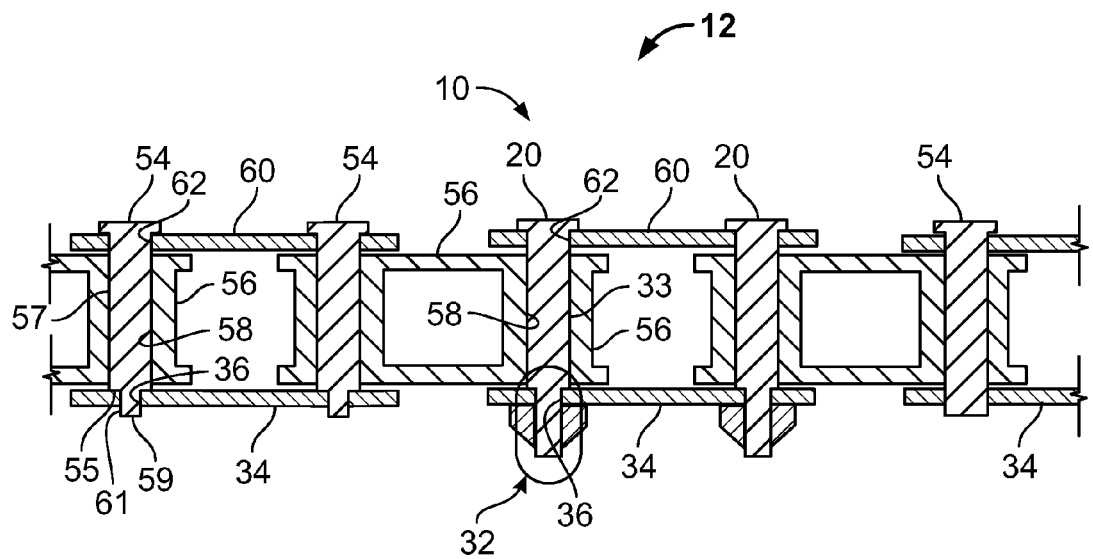
FIG. 3 is an enlarged, partial view of a chain taken from region 3 of FIG. 1 of the present invention.

FIG. 3, which is a view taken along the region 3 of FIG. 1, shows a portion of chain strand or chain 12. Chain 12 includes a series of interconnected first links 34 and second links 60 having respective openings 36, 62 formed in opposite end of the links. Openings 36, 62 of respective first link 34 and second link 60 are aligned with a respective opening 58 of spacer 56 and configured to receive a pin 20, with a fastener 32 that is utilized to establish a pinned joint of the present disclosure, in which fastener 32 is intended as a single use fastener. That is, fastener 32 is intended to be assembled to chain 12, and upon disassembly of chain 12, fastener 32 is to be discarded and replaced with a new fastener 32, for purposes of extended service life associated with uniform installation and flexing of the pinned joint as compared with other pinned joints of the chain, as previously discussed.

It is to be understood that chain strand or chain 12 may be composed of multiple first and second links 34, 60 and pins 20, such as the two pins 20 shown in the exemplary embodiment in FIG. 3. However, in another embodiment, a single pin 20 may be used to secure the connector link as previously discussed.

Figure 4:
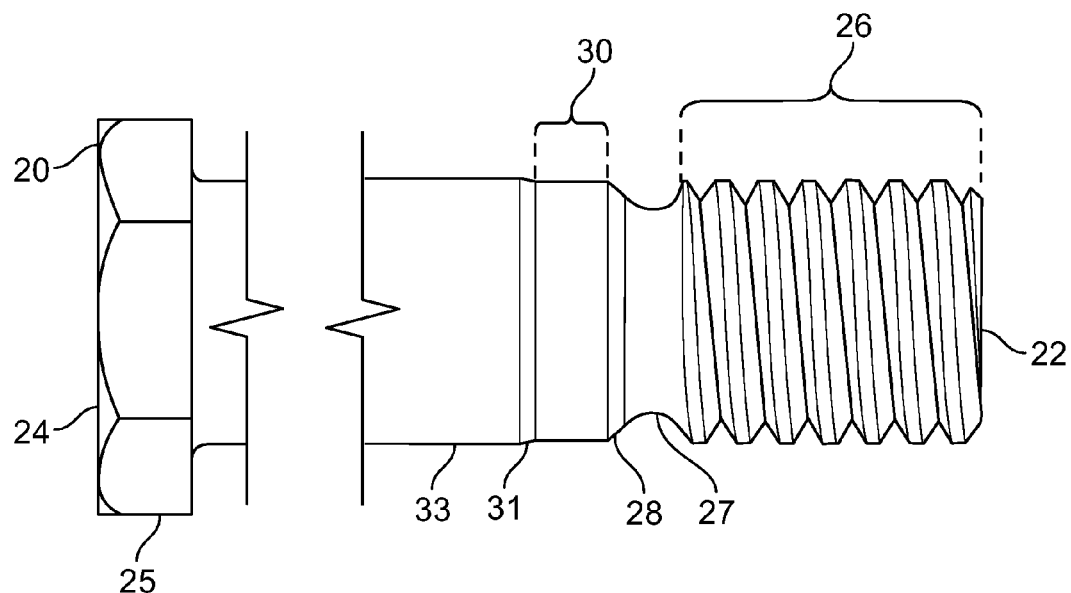
FIG. 4 is an enlarged, partial view of a pin of the present invention.

As shown FIGS. 3-4, pin 20 includes a first end 22 and a second end 24. First end 22, which is opposite a head 25, is adjacent to a threaded portion 26 and extends to a thread relief portion 27. Thread relief portion 27 is positioned between threaded portion 26 and a guide region 28. As further shown in FIG. 4, guide region 28 resembles a chamfer or region of uniformly increasing cross-section proceeding in a direction away from thread relief portion 27 toward head 25. In another embodiment, guide region 28 may increase in cross-section in a non-uniform manner. Guide region 28 extends to a transition region 30 that similarly has an increasing cross-section proceeding in a direction away from guide region 28 toward head 25. Typically, the size of cross-sectional areas of transition region 30, with perhaps the exception of a portion of guide region 28 immediately adjacent the transition region and the guide region which may be substantially the same size, is greater than the size of cross-sectional areas associated with guide portion 28. Transition region 30 terminates at a shoulder 31, with a shank 33 that is positioned between head 25 and shoulder 31. As shown in FIG. 4, shank 33 adjacent shoulder 31 contains a cross-sectional area that is substantially of uniform cross-sectional area and which is greater than the cross-sectional area of shoulder 31. In another embodiment, at least a portion of shank 33 adjacent shoulder 31 contains a cross-sectional area that is greater than the cross-sectional area of shoulder 31.

During fabrication of pin 20, the outside diameter, also referred to as the major diameter of threaded portion 26 is reduced. In one embodiment, the amount of reduction of the major diameter is substantially uniformly reduced. As a result of the reduction of the major or outer diameter of threaded portion 26, single-use fasteners are substantially prevented from being reused. That is, threaded fastener such as fastener 32 (FIG. 3) may be brought into threaded engagement by directing fastener 32 into threaded engagement over first end 22 of pin 20 until a predetermined torque value is attained. Upon attaining such predetermined torque value, by virtue of the reduction of the outer or major diameter of threaded portion 26, the threads of fastener 32 are damaged. While this damage does not manifest itself upon the initial installation of fastener 32, i.e., fastener 32 may safely remain in position once installed, upon disassembly of fastener 32 from pin 20, fastener 32 may typically not be reused.

To assemble chain 12 using rivet or fastener 54, opening 62 of second link 60 and opening 58 of spacer 56, each of which openings 58, 62 are of greater cross-sectional area than a shank 57 of rivet or fastener 54, permit the second link 60 and spacer 56 to be installed over an end 59 of fastener 54 and to collectively slide past a shoulder 55 formed in fastener 54. In other words, openings 62, 58 of respective second link 60 and spacer 56 form a pinned connection with shank 57 of fastener 54. In contrast, opening 36 of first link 34 has a greater cross-sectional area than a portion 61 of fastener 54 located between end 59 and shoulder 55 of fastener 54, although the cross-sectional area of opening 36 is less than the cross-sectional area of shoulder 55. Stated another way, opening 36 of first link 34 slides over portion 61 of fastener 54 and abuts shoulder 55. Utilizing "bucking" or other suitable technique, the cross-sectional area of end 59 of fastener 54 is sufficiently enlarged to secure first link 34 between end 59 and shoulder 55 of fastener 54. In other words, to disassemble the chain along a pinned connection secured by rivet or fastener 54, the enlarged cross-sectional end 59 of fastener 54 would need to be removed, such as by utilizing a drill bit to "drill out" the enlarged cross-sectional end 59 of the fastener, thereby requiring replacement of the rivet or fastener 54.

To assemble chain 12 using pin 20, opening 62 of second link 60 and opening 58 of spacer 56, each of which openings 58, 62 are of greater cross-sectional area than shank 33, permit the second link 60 and spacer 56 to be installed over first end 22 of pin 20 and to collectively slide past threaded portion 26, thread relief portion 27, guide region 28, transition region 30, shoulder 31 and over shank 33. In other words, openings 62, 58 of respective second link 60 and spacer 56 form a pinned connection with shank 33. In contrast, opening 36 of first link 34 is of greater cross-sectional area than threaded portion 26, thread relief portion 27, guide region 28, but of equal or lesser cross-sectional area than transition region 30, less than the cross-sectional area of shoulder 31. Stated another way, to assemble first link 34 with pin 20, opening 36 of first link 34 is directed over first end 22 of pin 20 and slides over threaded portion 26, thread relief portion 27, guide region 28. Guide region 28 is configured to help guide opening 36 past guide region 28 and toward transition region 30. However, since opening 36 of first link 34 of the cross-sectional area is less than or equal to transition region 30, opening 36 is brought into abutting contact with the transition region. To assemble a pinned connection utilizing pin 20, a fastener 32, such as a nut is directed over first end 22 of pin 20. Pin 20, fastener 32 and associated components comprise pin assembly 10. Upon application of a predetermined torque or torque value, the abutting contact between opening 36 and transition region 30 may not permit first link 34 to come into contact with shoulder 31 of pin 20. However, depending upon tolerances between opening 36 and transition region 30, upon application of the predetermined torque, first link 34 may be brought into abutting contact with shoulder 31 of pin 20. In either event, a compression fit is established between opening 36 and transition region 30, providing an improved, stable foundation for the pinned joint.

However, by virtue of the unique construction of pin 20, the threaded portion 26 is at least partially modified during fabrication of the pin. That is, the outer or major diameter of threads of threaded portion 26 is reduced by removal of material from the threads. During the assembly process in which a predetermined torque is applied to fastener 32 that is in threaded engagement with threaded portion 26 of pin 20, at least a threaded segment of fastener 32 is damaged, substantially limiting reuse of fastener 32 after the fastener has been disassembled from the threaded portion.

It is to be understood that although a threaded segment of fastener 32 is damaged, if the damage occurs during initial or first-time assembly of fastener 32 with pin 20, the established joint is robust and may be left intact. However, upon disassembly of fastener 22 and pin 20, an amount of damage is inflicted upon fastener 32, fastener reuse is substantially limited (i.e., reuse or subsequent assembly of the fastener with pin 20). For purposes herein, substantially limited is intended to include "single use fasteners", but also is intended to include "multiple use" fasteners, with such multiple use typically being limited (although not strictly so limiting for all fasteners) to two or three reuses.

One having ordinary skill in the part can reliably determine when a proper installation of a fastener, such as a nut, has occurred. For example, for a given diameter and type of material, industry standards such as ANSI (American Standards Institute) or ASME (American Society of Mechanical Engineers) identifies acceptable torque levels to secure the fastener. With a proper installation, an operator installing the fastener can sense or detect, such as by viewing a dial or indicator gauge included on certain torque devices, or by ordinary tactile "feel" that the amount of torque gradually increases during installation. An abrupt decrease in torque during the installation process is an indicator that the fastener threads are too badly damaged to permit a proper installation, and that the fastener should be replaced.

Alternately, during disassembly, if the disassembly torque does not gradually increase, corresponding to removal of the fastener, the fastener should be discarded. Yet another way to determine whether a fastener can be reused would be to perform a measurement of the major/minor diameters of the fastener against standards, such as previously mentioned ANSI or ASME specifications. Fasteners that have major/minor diameter measurements that fall outside specification ranges should also be discarded.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A pin assembly for a chain of a material moving system comprising:
    a pin having a first end and a second end, the first end comprising a threaded portion extending to a guide region having a reduced cross-section compared to the threaded portion, the threaded portion being at least partially modified during fabrication of the pin, the guide region extending to a transition region of increasing cross-section with respect to the guide region from the first end toward the second end, the transition region terminating at a shoulder;
    a fastener configured to engage the threaded portion during construction of the chain;
    in response to an opening of a first chain link being directed over the first end of the pin during construction of the chain, the opening having a cross-section greater than a cross-section of the guide region and less than or equal to a cross-section of the transition region, the fastener urges the first chain link to a position over the transition region, forming a compression fit between the opening and the transition region in response to a predetermined torque applied to the fastener; and
    wherein during application of the predetermined torque to the fastener, the fastener threadedly engaging the threaded portion of the pin, at least a threaded segment of the fastener is damaged, substantially limiting reuse of the fastener after the fastener has been disassembled from the threaded portion of the pin.

2. The pin assembly of claim 1, wherein the fastener is nut.

3. The pin assembly of claim 1, wherein the fastener is a lock nut.

4. The pin assembly of claim 1, wherein the major diameter of threads of the threaded portion is reduced.

5. The pin assembly of claim 4, wherein the major diameter of threads of the threaded portion is substantially uniformly reduced.

6. The pin assembly of claim 1, wherein the cross-section of the transition region increases substantially uniformly between the guide region and the shoulder.

7. The pin assembly of claim 1, wherein the first chain link is positioned between the guide region and the shoulder upon application of the predetermined torque to the fastener.

8. The pin assembly of claim 1, wherein the first chain link abuts the shoulder upon application of the predetermined torque.

9. The pin assembly of claim 1, wherein the material moving system is a harvesting device.

10. The pin assembly of claim 1, wherein an opening of a second chain link has a cross-section greater than the cross-section greater of the transition region.

11. The pin assembly of claim 10, wherein the opening of the second chain link slides over a shank and abuts a surface of a head near the second end of the pin.

12. A method for substantially preventing inadvertent subsequent assembly of a preassembled chain of a material moving system due to limiting reuse of previously engaged portions of the chain comprising:
    providing a pin having a first end and a second end, the first end comprising a threaded portion extending to a guide region having a reduced cross-section compared to the threaded portion, the threaded portion being at least partially modified during fabrication of the pin, the guide region extending to a transition region of increasing cross-section with respect to the guide region from the first end toward the second end, the transition region terminating at a shoulder;
    providing a fastener configured to engage the threaded portion of the pin during construction of the chain;
    assembling the pin with the fastener, forming a compression fit between the opening and the transition region in response to a predetermined torque applied to the fastener and resulting in damage to at least a segment of the fastener, substantially limiting reuse of the fastener after the fastener has been disassembled from the pin.

\* \* \* \* \*